United States Patent [19]
Adelman et al.

[11] Patent Number: 5,598,362
[45] Date of Patent: Jan. 28, 1997

[54] APPARATUS AND METHOD FOR PERFORMING BOTH 24 BIT AND 16 BIT ARITHMETIC

[75] Inventors: Judah L. Adelman, Jerusalem; Paul Marino, Kfar-Saba; Avner Goren, Rosh-Haayin, all of Israel; Garth Hillman, Austin, Tex.

[73] Assignee: Motorola Inc., Schaumburg, Ill.

[21] Appl. No.: 361,406

[22] Filed: Dec. 22, 1994

[51] Int. Cl.⁶ .................................................. G06F 7/38
[52] U.S. Cl. ............................................................ 364/736
[58] Field of Search .............................................. 364/736

[56] References Cited

U.S. PATENT DOCUMENTS 4,575,812   3/1986   Kloker et al. ........................... 364/760
4,843,585   6/1989   Williams ................................. 364/759

OTHER PUBLICATIONS

Motorola Inc., "DSP56000 Digital Signal Processor Family Manual", 1992, pp. 3–1 through 3–19.

*Primary Examiner*—Tan V. Mai
*Attorney, Agent, or Firm*—Daniel D. Hill

[57] ABSTRACT

A data ALU (arithmetic logic unit) (54) in a data processing system (20) performs both 24-bit arithmetic, and 16-bit exact arithmetic (including shifting and logical operations) using the same hardware. For a multiply/accumulate operation in 16-bit exact mode, shifting operations are used to align the operands so that 16-bit exact mode is transparent to a user. An entire instruction set can be executed in 24-bit mode or 16-bit exact mode. The same instructions and hardware are used in both modes. A transition between modes is performed by changing a status bit (97) in a status register (95).

17 Claims, 3 Drawing Sheets

5,598,362

APPARATUS AND METHOD FOR PERFORMING BOTH 24 BIT AND 16 BIT ARITHMETIC

CROSS REFERENCE TO RELATED APPLICATION

A related application entitled "POWER REDUCTION IN A DATA PROCESSING SYSTEM USING PIPELINE REGISTERS AND METHOD THEREFOR", by Adelman et al., Ser. No. 08/361,405, was filed concurrently herewith, and assigned to the assignee hereof.

FIELD OF THE INVENTION

This invention relates generally to data processing, and more particularly, to an apparatus and method for performing both 24 bit and 16 bit arithmetic.

BACKGROUND OF THE INVENTION

Digital signal processing is the arithmetic processing of read-time signals sampled at regular intervals and digitized. A digital signal processor (DSP) is used for digital signal processing functions such as filtering, mixing, and comparison of signals. In some data processing systems, a DSP may be included with a host processor to deal with any digital signal processing chores. A host processor may include, for example, a microcomputer or a microprocessor.

A basic operation in a DSP is a multiply/accumulate (MAC) operation. Circuits which multiply two binary numbers and add, or accumulate, the result with a third binary number are commonly used in digital signal processing. In digital signal processing algorithms, such as for doing Fourier transforms, finite impulse response (FIR) filters, infinite impulse response (IIR) filters, and the like, it is helpful to have the capability to perform a MAC instruction using hardware.

Some applications require more accuracy, or more precision, in an arithmetic operation than other applications. For example, high fidelity sound may require more bits for a higher degree of accuracy than are required for voice transmissions. In contrast, some applications may require a particular number of bits, regardless of the ability to provide greater accuracy, and the greater precision from using more bits is not allowed. For example, standards in cellular communications, such as the GSM standards in Europe, require that a certain input bitstream results in an exact bit accurate output. The GSM standards require exactly 16 bits of precision and will not allow more bits of precision. However, many of today's multimedia applications for digital signal processing may require high audio quality while also having the capability of conforming to GSM standards in a cellular communication environment.

SUMMARY OF THE INVENTION

Accordingly, there is provided, in one form, a method for performing an arithmetic operation in a data processing system, the method including the steps of providing an N-bit operand to an M-bit storage unit, the N-bit operand having a first predetermined alignment in the M-bit storage unit, performing an arithmetic operation on the N-bit operand in the first predetermined alignment to obtain a result in the first predetermined alignment, storing the result in a 2M-bit storage unit, the result having the first predetermined alignment, and shifting the result to align the result in a second predetermined alignment, restoring the result in the 2M-bit storage unit, and negating all unused bits in the 2M-bit storage unit.

In another embodiment, an apparatus is provided for performing an arithmetic operation in a data processing system, the apparatus including a first M-bit register, a first execution unit, a 2M-bit register, a shifting circuit, a control circuit, and a status register. The first M-bit register stores a first N-bit operand, where M and N are integers and N is less than M. The first execution unit is coupled to the first M-bit register and performs an arithmetic operation on the first N-bit operand to obtain a result. The 2M-bit register is coupled to the first execution unit and is for storing the result. The shifting circuit is coupled to the 2M-bit register and to the execution unit for shifting the result. The control circuit is coupled to the shifting circuit, for controlling a shifting operation in response to a control bit. The status register is coupled to the control circuit, for storing the control bit.

These and other features and advantages will be more clearly understood from the following detailed description taken in conjunction with the accompanying drawings.

DESCRIPTION OF A PREFERRED EMBODIMENT

Generally, the present invention provides a data ALU having the capability of performing both 24-bit arithmetic and 24-bit logical operations and 16-bit arithmetic and 16-bit logical operations using the same hardware. Shifting operations, accomplished invisibly to a user, are performed on the operands to allow the 16-bit arithmetic and the 16-bit logical operations. An entire instruction set can be executed in 24-bit mode or 16-bit exact mode. The same instructions and hardware are used in both modes. A transition between modes is performed by changing a status bit in the status register. The 16-bit exact mode of operation allows nearly every operation of data ALU 54 to be performed that can performed in 24-bit mode. For example, in 16-bit mode, data ALU 54 performs rounding, double precision multiply, moves and shifts. In addition, all bit field operations can be performed in 16-bit mode. Twenty-four bit arithmetic is executed normally in 24-bit mode.

The terms "assert" and "negate" will be used when referring to the rendering of a signal, status bit, or similar apparatus into its logically true or logically false state, respectively. If the logically true state is a digital logic level one, the logically false state will be a digital logic level zero. And if the logically true state is a digital logic level zero, the logically false state will be a digital logic level one. The term "bus" will be used to refer to a plurality of signals which may be used to transfer one or more various types of information, such as data, addresses, control, or status.

Figure 1:
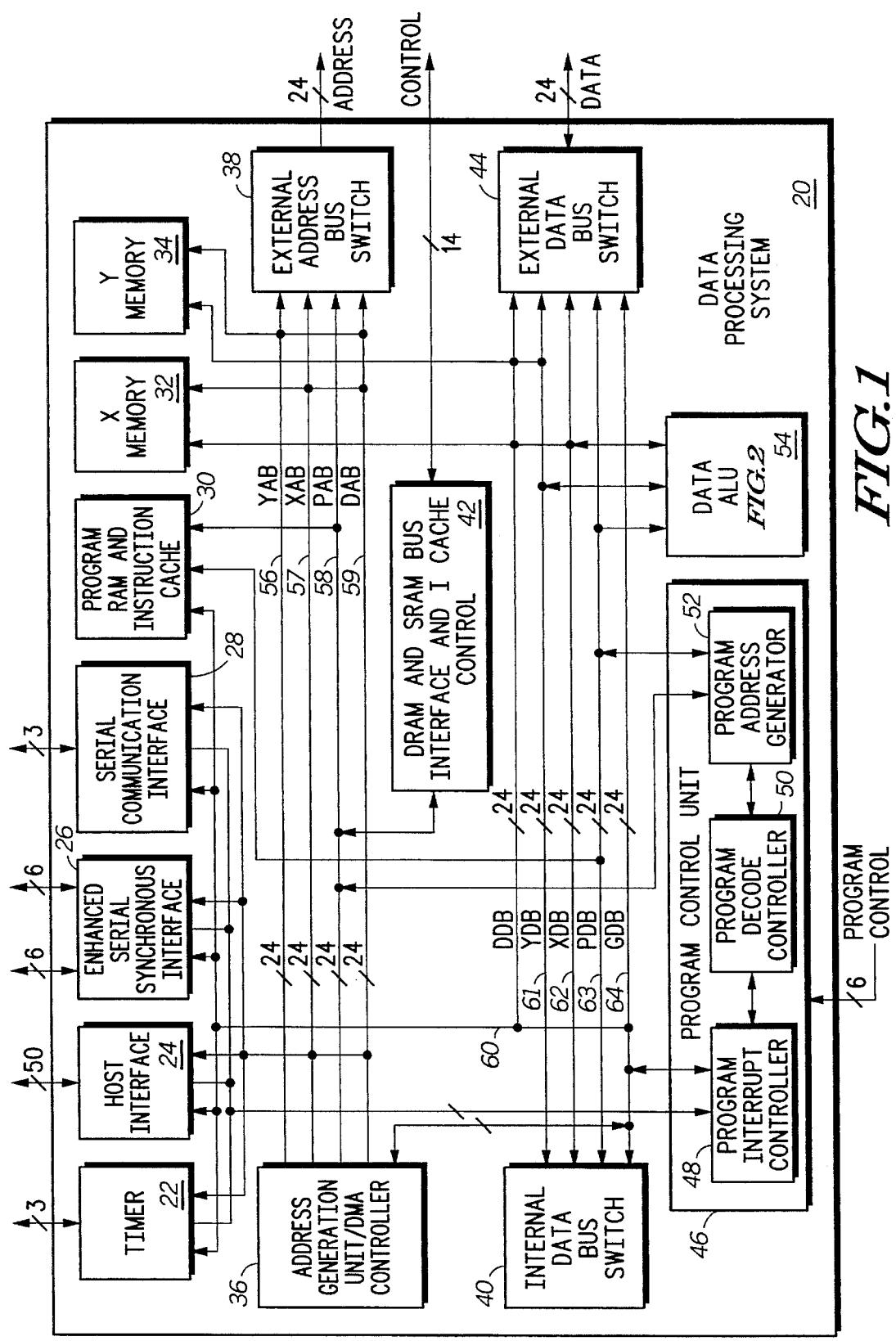
FIG. 1 illustrates in block diagram form, a data processing system in accordance with the present invention.

The present invention can be more fully described with reference to FIGS. 1–4. Each block illustrated in FIGS. 1–4 represents circuitry. FIG. 1 illustrates in block diagram form, data processing system 20 in accordance with the present invention. In the embodiment illustrated in FIG. 1, data processing system 20 is a digital signal processor (DSP) and is located on a single integrated circuit. In other embodiments, data processing system 20 may be, for example, a microcomputer or a microprocessor. Data processing system 20 includes timer 22, host interface 24, enhanced serial synchronous interface (ESSI) 26, serial asynchronous interface (SCI) 28, program RAM (random access memory) and instruction cache 30, X memory 32, Y memory 34, address generation unit/direct memory access (DMA) controller 36, external address bus switch 38, internal data bus switch 40, DRAM (dynamic random access memory) and SRAM (static random access memory) bus interface and instruction cache control 42, external data bus switch 44, program control unit (PCU) 46, and data arithmetic unit (ALU) 54. Program control unit 46 includes program interrupt controller 48, program decode controller 50, and program address generator 52.

Address bus 56, labeled "YAB", address bus 57, labeled "XAB", program address bus 58, labeled "PAB", and address bus 59, labeled "DAB", are coupled between address generation unit/DMA controller 36 and external address bus switch 38. Data bus 60, labeled "DDB", is coupled between host interface 24 and external data bus switch 44. Data bus 61, labeled "YDB", data bus 62, labeled "XDB", program data bus 63, labeled "PDB", and program data bus 64, labeled "GDB" are coupled between internal data bus switch 40 and external data bus switch 44.

Timer 22 includes three timers that can use internal or external timing, and can interrupt data processing system 20 or signal an external device. In addition, timer 22 can be used to signal a DMA transfer after a specified number of events have occurred. Each of the three timers is coupled to a single bi-directional pin or terminal. In addition, each timer of timer 22 is coupled to bus 57, bus 59, program interrupt controller 48, and to bus 60.

Host interface 24 provides a bi-directional interface for communications between data processing system 20 and another device such as a microcomputer, microprocessor, or DMA controller. Also, host interface 24 is bi-directionally coupled to external data bus switch 44 via bus 60, bi-directionally coupled to global data bus 64, to program interrupt controller 48, to address generation unit/DMA controller 36, and to external address bus switch 38 via buses 57 and 59. In addition, host interface 24 is bi-directionally coupled to 50 external pins or terminals for bi-directional data transfers, address register selections, and control communications from a host processor.

Enhanced serial synchronous interface (ESSI) 26 is coupled to 12 bi-directional external pins to provide serial communication with external serial devices including, for example, one or more industry standard codecs, DSPs (digital signal processors), or microprocessors. ESSI 26 also has terminals coupled to bus 57, bus 59, and bus 60.

Serial communication interface (SCI) 28 is coupled to 3 bi-directional external pins for providing serial communication with external devices. SCI 28 also has terminals coupled to bus 57, bus 59, and bus 60.

The embodiment of data processing system 20 illustrated in FIG. 1 has three memory spaces: program RAM and instruction cache 30, X memory 32, and Y memory 34. In other embodiments, there may be more or fewer memory spaces. Program RAM and instruction cache 30 is coupled to address bus 58 and to data bus 63. X memory 32 is coupled to address bus 57, address bus 59, data bus 60, and to data bus 62. Y memory 34 is coupled to address bus 56, address bus 59, data bus 60, and to data bus 61.

Address generation unit/DMA controller 36 is coupled to address buses 56, 57, 58, and 59. Address generation unit/DMA controller 36 provides memory addresses to timer 22, host interface 24, ESSI 26, SCI 28, program RAM and instruction cache 30, X memory 32, Y memory 34, external address bus switch 38, and to DRAM and SRAM bus interface and instruction cache control 42. In a preferred embodiment, the DMA controller has six channels.

DRAM and SRAM bus interface and instruction cache 42 is coupled to program address bus 58 and to 14 bi-directional external pins. The instruction cache of DRAM and SRAM bus interface and instruction cache 42 functions as a buffer memory between external main memory (not shown) and program control unit 46. The instruction cache stores program instructions that are frequently used. An increase in performance may result when instruction words required by a program are available in the cache, because time required to access the main memory is eliminated.

Internal data bus switch 40 is coupled to data bus 60, data bus 61, data bus 62, program data bus 63, and to global data bus 64. External data bus switch 44 is coupled to internal data bus switch 40 via data bus 60, data bus 61, data bus 62, program data bus 63, and to global data bus 64. In addition, external data bus switch 44 is coupled to timer 22, host interface 24, ESSI 26, and SCI 28 via data bus 60. Internal data bus switch 40 is used for transfers between buses. Any two buses can be connected together through internal data bus switch 40. External address bus switch 38 and external data bus switch 44 couple external buses (not shown) to any internal address bus and internal data bus, respectively.

In program control unit 46, program interrupt controller 48 arbitrates among interrupt requests, and is coupled to timer 22, host interface 24, ESSI 26, and SCI 28. Also, program interrupt controller 48 is bi-directionally coupled to global data bus 64 and program decode controller 50. Program decode controller 50 decodes each 24-bit instruction and is bi-directionally coupled to program interrupt controller 48 and to program address generator 52. Program address generator 52 contains all of the hardware needed for program address generation, system stack, and loop control. In addition, program address generator 52 is coupled to program address bus 58 and to program data bus 63.

Data arithmetic logic unit (ALU) 54 is coupled to program data bus 63, data bus 61, and to data bus 62. Data ALU 54 performs all of the arithmetic and logical operations on data operands. Data ALU 54 contains registers which may be read or written over by way of buses 61 and 62. Data ALU 54 is also coupled to bus 63 and to bus 60.

Clock generator circuits (not shown) provide clock signals to all of the blocks shown in FIG. 1. There is also test circuitry in data processing system 20 that is not shown in FIG. 1.

Figure 2:
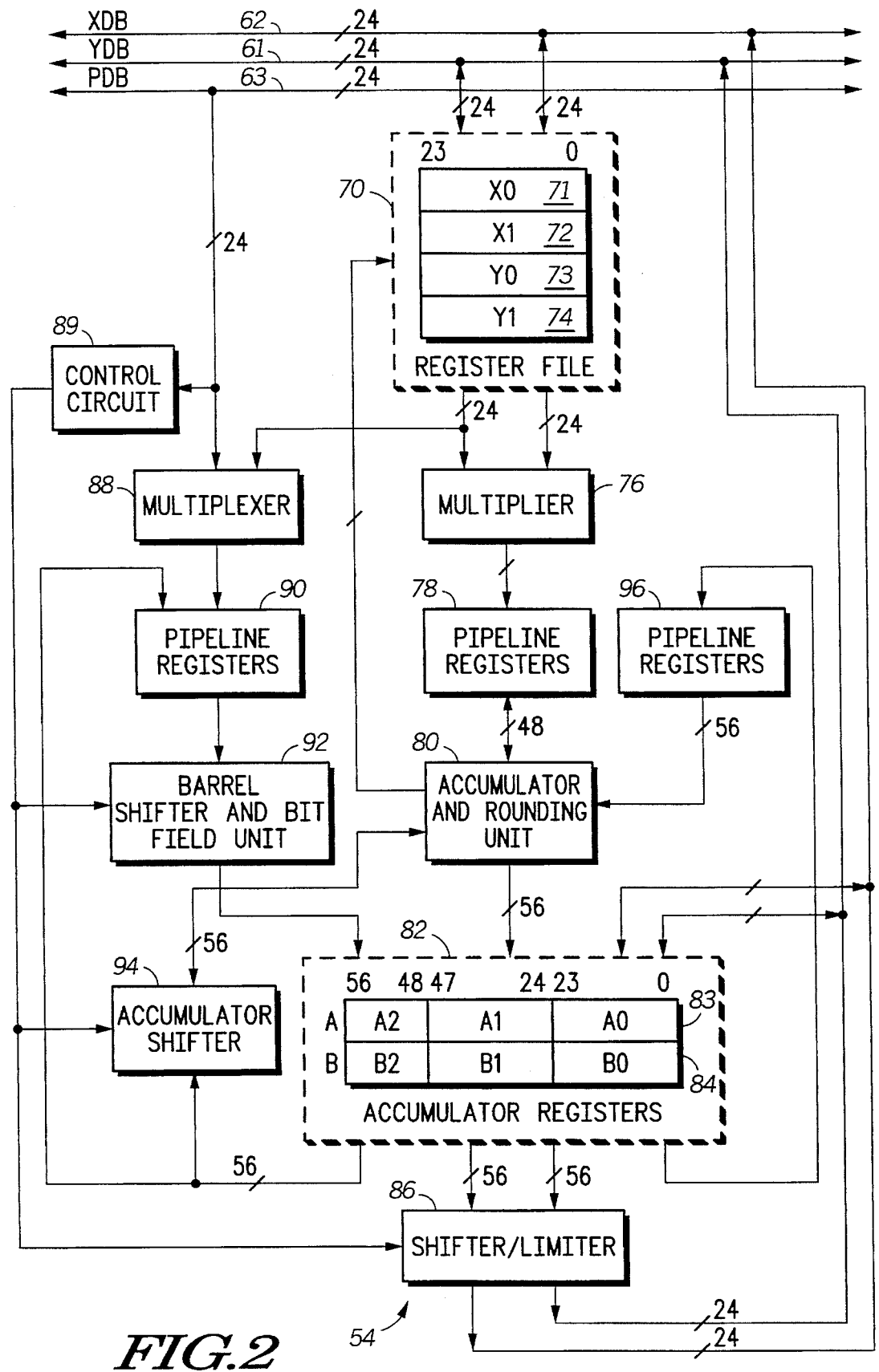
FIG. 2 illustrates in block diagram form, the data arithmetic logic unit of the data processing system of FIG. 1.

FIG. 2 illustrates in block diagram form, data arithmetic logic unit (ALU) 54 of data processing system 20 of FIG. 1. Data ALU 54 performs the arithmetic and logical operations for data processing system 20. Data is stored and operated on in signed fractional format in data ALU 54. Data ALU 54 includes register file 70, multiplier 76, pipeline registers 78, 90, and 96, accumulator and rounding unit 80, accumulator registers 82, shifter/limiter 86, multiplexer 88, control circuit 89, barrel shifter and bit field unit 92, and accumulator shifter 94. Register file 70 includes registers 71–74. Accumulator registers 82 includes accumulator register 83 and accumulator register 84.

Register files 70 are coupled to data buses 61 and 62 for receiving data operands from X memory 32, Y memory 34, or from an external memory location (not shown). Each register of registers 71–74 is a read/write register which can store a 24 bit operand. Registers 71–74 serve as input buffer registers between data buses 61 and 62 and data ALU 54. Output terminals of register file 70 are coupled to input terminals of multiplexer 88 and to input terminals of multiplier 76. Multiplier 76 is an execution unit and comprises a conventional array multiplier such as a modified Booth's multiplier, a Wallace Tree, or the like. Multiplier 76 performs multiply operations on operands represented as fractions. In a multiply/accumulate operation, an intermediate result of a multiply operation is provided to pipeline registers 78, which temporarily stores the intermediate result prior to providing the intermediate result to accumulator and rounding unit 80. Accumulator and rounding unit 80 also functions as an execution unit in data ALU 54.

Data ALU 54 is pipelined, and every MAC operation is performed in 2 clock cycles. In the first clock cycle, the multiply is performed by multiplier 76 and an intermediate result is stored in pipeline registers 78. In the second clock cycle, the accumulator is added or subtracted from the intermediate result. A new instruction can be initiated in every clock cycle. Rounding is performed if specified in the instruction. The rounding is either convergent rounding (round to the nearest even), or two's complement rounding. The type of rounding is specified by a rounding bit in the status register of program control unit 46. Program control unit 46 is illustrated in FIG. 1. The bit in the accumulator register that is rounded is specified by the scaling mode bits in the status register. Pipeline registers 78 are coupled to output terminals of multiplier 76 for receiving the intermediate result from a multiply operation. Output terminals of pipeline registers 78 provide the intermediate result to input terminals of accumulator and rounding unit 80. The intermediate result is added to an operand stored in one of accumulator registers 83 or 84. Pipeline registers 96 has input terminals coupled to output terminals of accumulator registers 82, and output terminals coupled to input terminals of accumulator and rounding unit 80 for transferring data from one of accumulator registers 83 or 84 to accumulator and rounding unit 80. A final result is typically stored back in the same register, either accumulator register 83 or 84. However, the final result may be written back to a register of register file 70.

Accumulator registers 83 and 84 each comprises 3 concatenated registers to produce a total of 56 bits. In accumulator register 83, a 24-bit general purpose read/write register labeled "A0" stores a 24-bit least significant product (LSP). A0 comprises bits 0–23 of accumulator register 83. A 24-bit read/write register labeled "A1" stores a 24-bit most significant product (MSP). A1 comprises bits 24–47 of accumulator register 83. An 8-bit read/write register labeled "A2" is a sign extension (EXT) and overflow register. A2 comprises bits 48–56 of accumulator register 83. In accumulator register 84, a 24-bit general purpose read/write register labeled "B0" stores 24-bit LSP. B0 comprises bits 0–23 of accumulator register 84. A 24-bit read/write register labeled "B1" stores a 24-bit MSP. B1 comprises bits 24–47 of accumulator register 84. An 8-bit read/write register labeled "B2" functions as a sign extension and overflow register. B2 comprises bits 48–56 of accumulator register 84. Accumulator registers 82, and register file 70 are in a programming model for data processing system 20.

Output terminals of accumulator registers 82 are coupled to input terminals of shifter/limiter 86 for transferring 56 bits of data from accumulator registers 82 to shifter/limiter 86. Shifter/limiter 86 comprises two conventional asynchronous parallel shifter/limiters. One shifter/limiter is coupled to data bus 61 and the other shifter/limiter is coupled to data bus 62. The limiters are used to minimize errors due to overflow. Limiting occurs when the extension registers A2 and B2 are in use and the contents of accumulator register 83 or 84 are to be transmitted over data bus 61 or data bus 62. The limiter will substitute a limited data value with a maximum magnitude. If extension registers A2 and B2 are not being used, then the limiters are disabled. The two data limiters can also be combined to form one 48-bit data limiter for long-word operands. The data shifters in shifter/limiter 86 can shift data one bit to the left (scale up) or one bit the right (scale down), as well as passing the data unshifted (no scaling). The shifters permit dynamic scaling of fixed-point data without modifying the program code. For example, this permits block floating-point algorithms such as fast Fourier transforms to be implemented in data processing system 20.

Accumulator shifter 94 has input terminals coupled to output terminals of accumulator registers 82, and output terminals coupled to accumulator and rounding unit 80. Accumulator shifter 94 is an asynchronous parallel shifter for shifting the information of accumulator registers 82. Accumulator shifter 94 then provides the shifted information back to accumulator and rounding unit 80. Control circuit 89 is coupled to accumulator shifter 94, shifter/limiter 86, and barrel shifter and bit field unit 92. Control circuit 89 performs the control functions for data ALU 54 in response to instructions received from program control unit 46 by way of bus 63. For example, control circuit 89 determines the shifting operations required for a MAC instruction that is performed when data ALU 54 is in 16-bit exact mode.

Multiplexer 88 has input terminals coupled to bus 63 and to register file 70. Output terminals of multiplexer 88 are coupled to input terminals of pipeline registers 90. Output terminals of pipeline registers 90 are coupled to barrel shifter and bit field unit 92. Barrel shifter and bit field unit 92 is coupled to input terminals of accumulator registers 82. Barrel shifter and bit field unit 92 contains a 56-bit parallel bi-directional shifter, and performs multibit left shift, multibit right shift, 1-bit rotate (left or right), bit field merge, insert and extract, count leading bits normalization, and logical operations such as AND, OR, exclusive OR, and NOT. Barrel shifter and bit field unit 92 can perform all of these operations for the 24-bit and 16-bit exact modes of operation. In the 16-bit exact mode, the bit field operations are performed on the appropriate bit position for 16-bit data.

Data ALU 54 provides a complete solution for both 24-bit and 16-bit exact arithmetic. An entire instruction set can be executed in 24-bit mode or 16-bit exact mode, including multiprecision arithmetic. The same instructions and hardware are used in both modes. A transition between modes is performed by changing a bit in the status register. The 16-bit exact mode of operation allows nearly every operation of data ALU 54 to be performed that can performed in 24-bit mode. For example, in 16-bit exact mode, data ALU 54 performs rounding, double precision multiply, moves and shifts. In addition, all bit field operations can be performed in 16-bit exact mode.

During moves while in 16-bit exact mode, data is written and read over buses 61, 62, and 63 as 24 bits or 48 bits. There are no 16-bit moves. When moving data from bus 61 and bus 62 into one of accumulator registers 82, the 16 least significant bits from bus 61 will be placed in bits 32–47 of the selected accumulator register of accumulator registers 82, and zeros will be loaded into bits 24–31 of the accumulator register. The 16 least significant bits from bus 62 will be placed in bits 8–23 and zeros will be loaded into bits 0–7. Bits 48–56 will be loaded with sign extension.

When moving data from bus 61 or bus 62 in one of registers 71–74, the 16 least significant bits on the bus will be loaded into the 16 most significant bits of the destination register. Zeros are loaded into the 8 least significant bits of the register. When moving data from bus 61 or bus 62 into a 48-bit register, such as a register formed by concatenating two registers of registers 71–74, the 16 least significant bits of bus 62 are loaded into the 16 most significant bits of registers 72 or 74, and the 16 least significant bits of bus 61 are loaded into the 16 most significant bits of registers 71 or 73.

For data entering the execution units, such as multiplier 76, accumulator and rounding unit 80, and barrel shifter and bit field unit 92, the data is first aligned and placed in the execution unit in a predetermined alignment to make the 16-bit exact mode transparent to a user of data processing system 20. When performing 16-bit arithmetic operations, the use of fractional arithmetic makes the aligning easier. Various multiplexing and shifting circuits are used to accomplish the necessary alignment for 16-bit exact mode. In 16-bit exact mode, rounding of the arithmetic operation is performed on bit 15 of accumulator portion A1/B1 instead of A0/B0 as accomplished in 24-bit mode. The scaling, as well as the shifting/limiting operation of data ALU 54 are affected accordingly. The steps required to perform a 16-bit exact MAC instruction using data ALU 54 are illustrated in FIG. 3 as an example.

Figure 3:
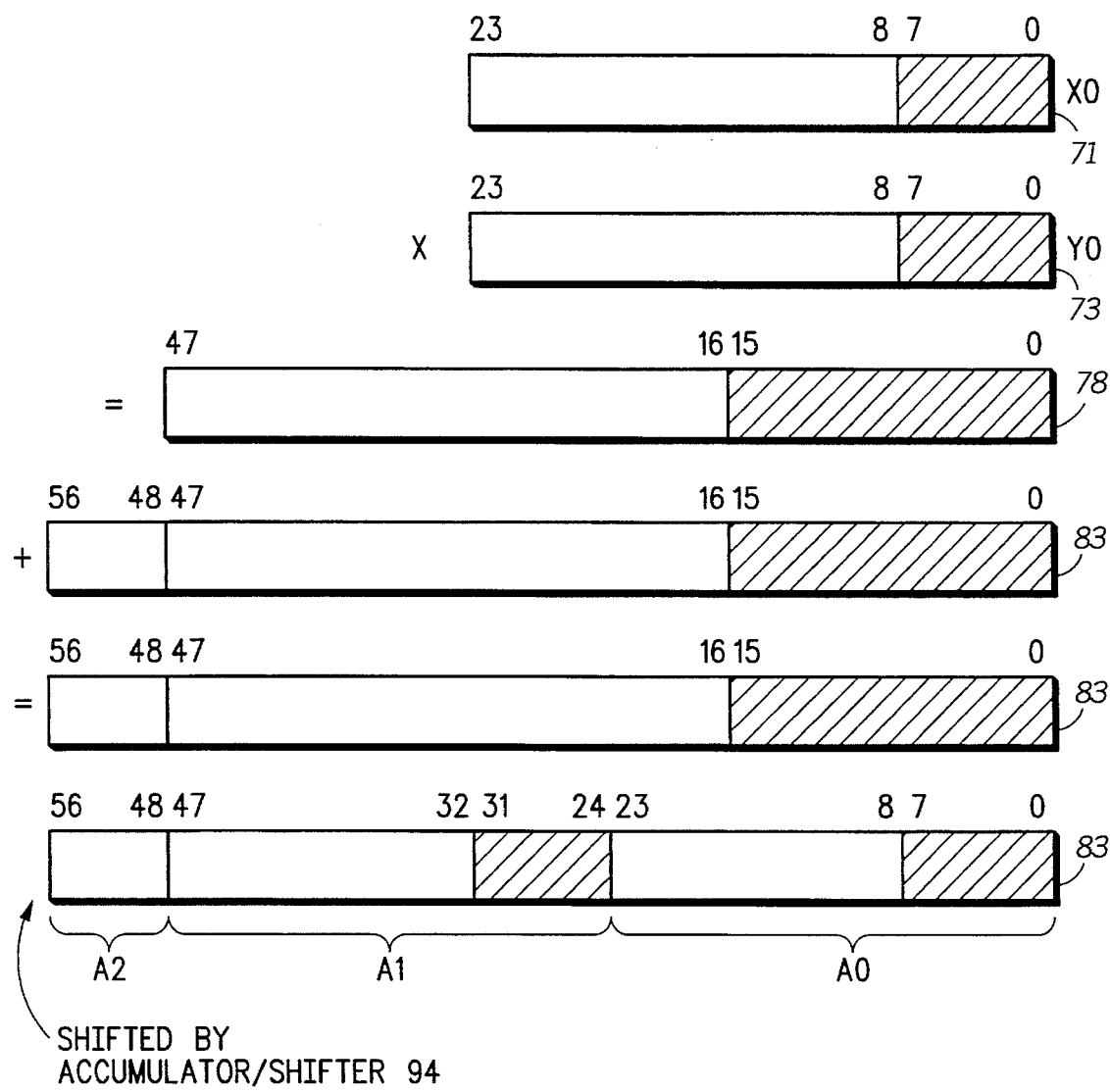
FIG. 3 illustrates a 16-bit multiply/accumulate operation and data alignment in various registers in accordance with an embodiment of the present invention.

Referring to both FIG. 2 and FIG. 3, a first 16-bit operand is provided to a register of register file 70, for example, register 71 labeled "X0". The first operand may be provided from X memory 32 or Y memory 34 (FIG. 1). A second 16-bit operand is provided to another register of register file 70, for example register 73 labeled "Y0". The first and second operands are stored in the 16 most significant bits of the 24-bit registers 71 and 73. The 8 least significant bits of registers 71 and 73 are negated, or in the illustrated embodiment, written with logical zeros. The first 16-bit operand and the second 16-bit operand are multiplied together in multiplier 76 to obtain a 32-bit product. The 32-bit product is stored in the 32 most significant bits of an intermediate result register. In data ALU 54, pipeline registers 78 function as the intermediate result register. The 32-bit product is added to a third operand which is stored in one of accumulator registers 83 or 84. Before the addition, the third operand is shifted in accumulator shifter 94 to align, or match, the format of the 32-bit product, and is provided to accumulator and rounding unit 80. The result of the addition is written back to the same accumulator register 83 or 84.

When a data ALU is performing a MAC instruction, such as in an algorithm to implement an FIR filter, a result of the multiplication instruction is used as an operand for the accumulate instruction. The MAC instruction is executed for a predetermined number of iterations. In the prior art, the final result as written back to accumulator registers 82, or is written to one of the registers in register file 70 for each iteration of the MAC instruction. After each iteration, the result of the accumulate operation is written back to the same accumulator register. The bus between the accumulator and the accumulator register may be relatively long and have relatively heavy capacitive loading. Therefore, writing back to the accumulator register after each iteration may consume a significant amount of power.

To reduce power consumption in data ALU 54, unnecessary write backs to the same accumulator register of accumulator registers 82 are eliminated. Control circuit 89 monitors the series of instructions being provided to data ALU 54, and detects all cases where consecutive instructions have identical destinations for the final result. Whenever the same register is the destination of consecutive instructions, the result is only written to pipeline register 78, and not to a destination register named in the consecutive instructions. Thus, only the short, lightly loaded bus to pipeline register 78 is driven, instead of the longer heavily loaded bus to the accumulator register, resulting in significant power reduction.

Figure 4:
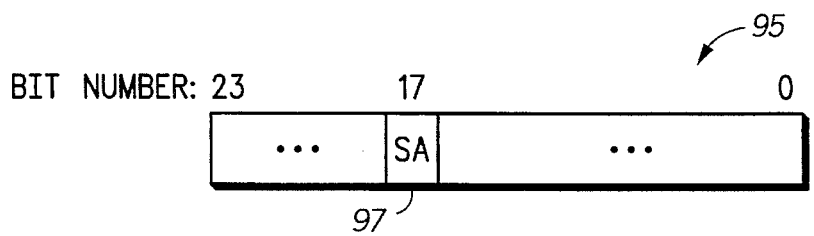
FIG. 4 illustrates in block diagram form, a status register of the program control unit of FIG. 1.

FIG. 4 illustrates in block diagram form, status register 95 of program control unit 46 of FIG. 1. Status register 95 is a conventional read/write 24-bit register. Status bit 97, labeled "SA" controls whether data ALU 54 will perform 24-bit arithmetic or 16-bit exact arithmetic. When control bit 97 is asserted, the 16-bit exact operating mode is entered. Status bit 97 is cleared during reset of data processing system 20.

While the invention has been described in the context of a preferred embodiment, it will be apparent to those skilled in the art that the present invention may be modified in numerous ways and may assume many embodiments other than that specifically set out and described above. For example, in the illustrated embodiment, a 16-bit exact mode and a 24-bit mode are disclosed operating with the same hardware. In other embodiments, the number of bits in an operand may be different and the number of modes supported by the same hardware may be different. Also, in the illustrated embodiment, specific registers have a particular number of bits and a particular bit organization. In other embodiments, different sized registers, a different number of registers, or register bit fields may be used. Accordingly, it is intended by the appended claims to cover all modifications of the invention which fall within the true spirit and scope of the invention.

What is claimed is:

1. A method for performing an arithmetic operation in a data processing system, the method comprising the steps of:

asserting a mode bit in a status register of the data processing system, the mode bit is asserted to enter an N-bit operating mode of the data processing system, and the mode bit is negated to enter an M-bit operating mode, where N and M are integers, and N is less than M;

providing a first N-bit operand to first M-bit storage unit when the mode bit is asserted, the first N-bit operand having a first predetermined alignment in the first M-bit storage unit;

providing a second N-bit operand to a second M-bit storage unit when the mode bit is asserted, the second N-bit operand having the first predetermined alignment in the second M-bit storage unit;

performing an arithmetic operation on the first and second N-bit operands in the first predetermined alignment to obtain a 2N-bit result in the first predetermined alignment;

storing the result in a 2M-bit storage unit, the 2N-bit result having the first predetermined alignment; and shifting the 2N-bit result to align the 2N-bit result in a second predetermined alignment with a shifting circuit, restoring the 2N-bit result in the 2M-bit storage unit, and negating all unused bits in the 2M-bit storage unit with the shifting circuit.

2. A method as in claim 1, wherein the step of performing an arithmetic operation comprises performing a multiply/accumulate operation.

3. A method as in claim 1, wherein the step of providing a first N-bit operand to a first M-bit storage unit comprises aligning the first N-bit operand to occupy N most significant bits of the first M-bit storage unit for performing signed fractional arithmetic.

4. A method as in claim 3, wherein N is equal to 16 and M is equal to 24.

5. A method as in claim 1, wherein the step of performing the arithmetic operation comprises performing a bit field operation.

6. A method as in claim 1, wherein the step of performing the arithmetic operation comprises performing double precision arithmetic.

7. A method for performing a multiply/accumulate operation in a data processing system, the method comprising the steps of:

asserting a mode bit in a status register of the data processing system, the mode bit is asserted to enter an N-bit operating mode of the data processing system, and the mode bit is negated to enter an M-bit operating mode, where N and M are integers, and N is less than M;

providing a first N-bit operand to a first M-bit register when the mode bit is asserted;

providing a second N-bit operand to a second M-bit register when the mode bit is asserted;

multiplying the first N-bit operand by the second N-bit operand to obtain a 2N-bit product;

storing the 2N-bit product in an intermediate result register;

providing an accumulator register storing a third operand, the accumulator register having at least 2M-bit storage capability;

shifting the third operand in the accumulator register to align the third operand with the 2N-bit product; and adding the 2N-bit product to the third operand to obtain a result, and storing the result.

8. A method as in claim 7, wherein the step of providing the accumulator register comprises a step of providing an accumulator register having 2 M-bit registers and an extension register.

9. A method as in claim 7, wherein the step of adding the 2N-bit product to the third operand to obtain the result and storing the result further comprises storing the result in the accumulator register.

10. A method as in claim 7, wherein the step of providing a first N-bit operand to a first M-bit register further comprises providing the first N-bit operand to most significant bit locations of the first M-bit register.

11. A method as in claim 7, wherein the step of multiplying the first N-bit operand by the second N-bit operand comprises multiplying the first and second N-bit operands when the first and second N-bit operands are expressed as fractions having a magnitude less than one.

12. A method as in claim 7, wherein N is equal to 16 and M is equal to 24.

13. An apparatus for performing an arithmetic operation in a data processing system, the apparatus comprising:

a first M-bit register, for storing a first N-bit operand, where M and N are integers and N is less than M;

a second M-bit register, for storing a second N-bit operand;

a first execution unit, coupled to the first M-bit register, for performing an arithmetic operation on the first and second N-bit operands to obtain a 2N-bit result;

a 2M-bit register, coupled to the first execution unit, for storing the 2N-bit result;

a shifting circuit, coupled to the 2M-bit register and to the first execution unit, for shifting the 2N-bit result;

a control circuit, coupled to the shifting circuit, for controlling a shifting operation in response to a status bit; and a status register, coupled to the control circuit, for storing the status bit, the status bit is asserted to enter an N-bit operating mode of the apparatus, and the status bit is negated to enter an M-bit operating mode.

14. An apparatus as in claim 13, further comprising:

a second execution unit, the second execution unit coupled to the 2M-bit register.

15. An apparatus as in claim 14, wherein the arithmetic operation is characterized as being a multiply/accumulate operation, the first execution unit for multiplying the first and second N-bit operands to obtain the result, and the second execution unit for adding the result to a third operand.

16. An apparatus as in claim 15, wherein the status bit is asserted to enter a 16 bit operating mode, and the status bit is negated to enter a 24 bit operating mode.

17. An apparatus as in claim 16, further comprising a bit field unit, coupled to the 2M-bit register and to the control circuit, for performing bit field operations in the 16 bit operating mode and in the 24 bit operating mode.

\* \* \* \* \*